(12) United States Patent
Williams et al.

(10) Patent No.: US 6,196,039 B1
(45) Date of Patent: Mar. 6, 2001

(54) GROOVE ROLLING OF PIPING ELEMENTS

(75) Inventors: James O. Williams, Marlborough, MA (US); Bruce M. Platusich; Sandra M. Lippka, both of Warwick, RI (US)

(73) Assignee: Anvil International, Inc., Portsmouth, NH (US)

( * ) Notice: Subject to any disclaimer, the term of this patent is extended or adjusted under 35 U.S.C. 154(b) by 0 days.

(21) Appl. No.: 09/363,922

(22) Filed: Jul. 30, 1999

Related U.S. Application Data

(60) Provisional application No. 60/126,105, filed on Mar. 25, 1999.

(51) Int. Cl.$^7$ .................................................... B21D 17/04
(52) U.S. Cl. ................................................................ 72/105
(58) Field of Search ............................. 72/105, 106, 118

(56) References Cited

U.S. PATENT DOCUMENTS

| | | |
|---|---|---|
| 1,284,093 | 11/1918 | Grotnes . |
| 1,333,137 | 3/1920 | Slick . |
| 1,463,073 | 7/1923 | Felten . |
| 1,541,601 | 6/1925 | Tribe . |
| 2,267,533 | 12/1941 | O'Brien . |
| 2,617,466 | 11/1952 | Kradoska . |
| 2,689,752 | 9/1954 | Webster . |
| 3,015,502 * | 1/1962 | Frost et al. ............................. 72/101 |
| 3,029,667 | 4/1962 | Sporck . |
| 3,191,416 | 6/1965 | Pritchett et al. . |
| 3,290,914 | 12/1966 | Vaill et al. . |
| 3,381,353 | 5/1968 | Lemmerz . |
| 3,541,826 * | 11/1970 | Halliburton ............................. 72/105 |
| 3,995,466 | 12/1976 | Kunsman . |
| 3,999,416 | 12/1976 | Brooks . |
| 4,114,414 | 9/1978 | Goodman . |
| 4,408,788 | 10/1983 | Beukema . |
| 4,429,445 | 2/1984 | Fuminier . |
| 5,246,256 | 9/1993 | Rung et al. . |
| 5,279,143 | 1/1994 | Dole . |
| 5,450,738 | 9/1995 | Chatterly et al. . |
| 5,528,919 | 6/1996 | McGrady et al. . |
| 5,548,986 | 8/1996 | Matsuo et al. . |

FOREIGN PATENT DOCUMENTS

| | | |
|---|---|---|
| 535059 | 10/1931 | (DE) . |
| 18201 | 6/1916 | (GB) . |
| 57-94423 | 6/1982 | (JP) . |

OTHER PUBLICATIONS

"The Copper Connection" (Victaulic, 05/90), 12 pages.
"AWWA Standard for Grooved and Shouldered Joints" (Amer. Water Works Assoc., 4/87), 10 pages.

(List continued on next page.)

*Primary Examiner*—Lowell A. Larson
(74) *Attorney, Agent, or Firm*—Fish & Richardson P.C.

(57) ABSTRACT

Groove rollers, which are for use with a roll grooving device for forming a groove in an outer surface of a pipe near an end of the pipe, include an outside roller and an inside roller. The outside roller has a peripheral surface that includes a first protrusion configured to form the groove, and a second protrusion having a surface configured to inhibit flaring of the end of the pipe when forming the groove. The inside roller has a peripheral surface that includes a notch configured to receive the first protrusion, and may have a second notch configured to receive the second protrusion. A pipe abutment surface against which the end of the pipe is positioned when forming the groove is formed on one of the inside or outside rollers. In another feature, the outside roller includes a first aligning element and the inside roller includes a second aligning element configured to interact with the first aligning element to align the outside and inside rollers when forming the groove.

34 Claims, 10 Drawing Sheets

OTHER PUBLICATIONS

"Expanded Pipe Coupling Style 24" (Victaulic, 1985), 4 pages.

"Gruvlok® Products for Grooved Piping Systems" (Grinnell Corp., 9/91), 60 pages.

"Gruvlok® Pipe Machines" (Grinnell Corp., 2/92), 16 pages.

"Ridge Tool Subsidiary Emerson Electric Co." Model 918–I Roll Grooving Machine Literature (Rigid Tool Company, 1996).

"The Fastest Roll Grooving Machine in its Class?" Distributor New products Update, (Ridge Tool Company Information Line Addendum...Jun. 1996).

"Mechanical Piping System", (Victaulic), 4 pages, Nov. 1994.

"Pipe Preparation Tools", (Victaulic), 3 pages (no date).

"Pace Pipe Processing Equipment", (Pace Machinery Group, Inc.), 3 pages (no date).

"Gruvlok Copper Method", (Grinnell Supply Sales Company, 3/94, 3 pages, Mar. 1994.

"Gruvlok Copper–Prep", Model 1041C Roll Groover Operating Instructions, (Grinnell Supply Company), 2 pages (no date).

* cited by examiner

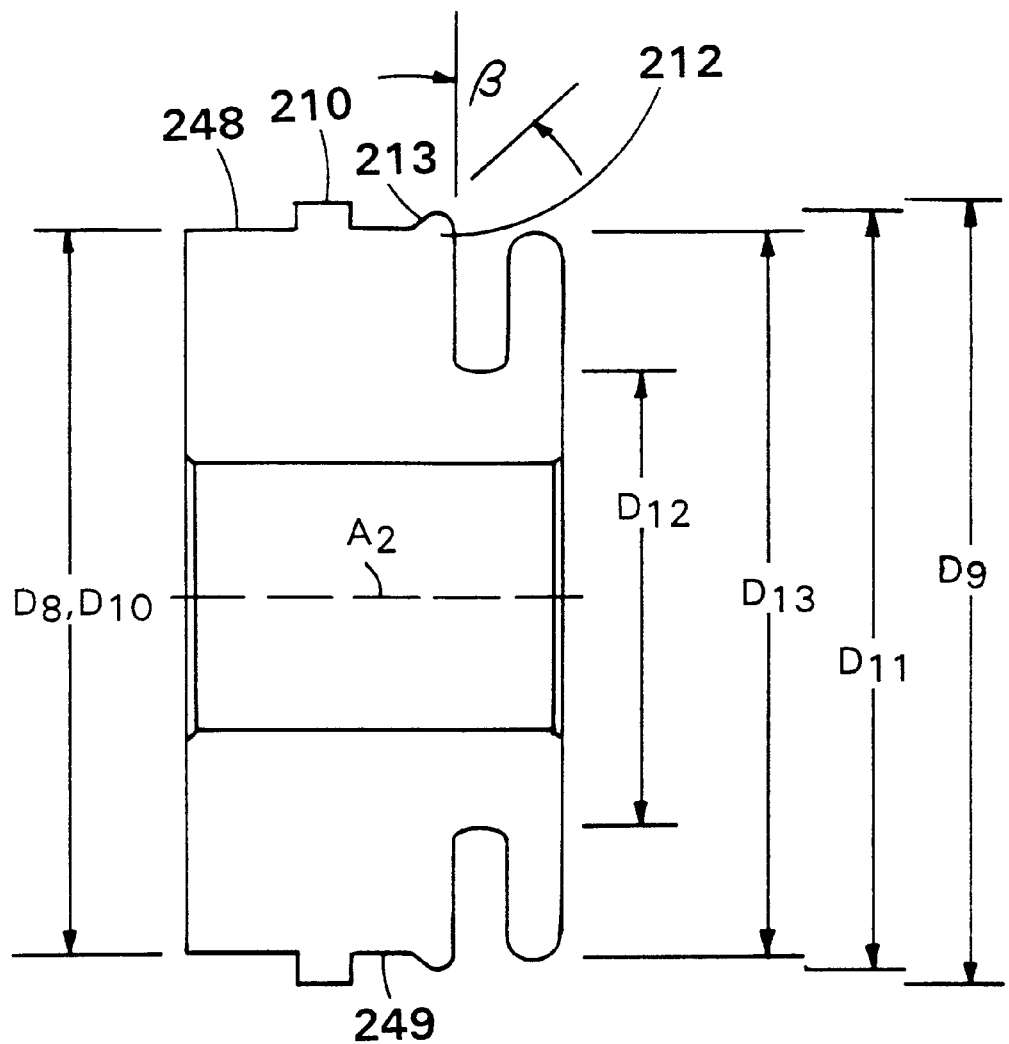
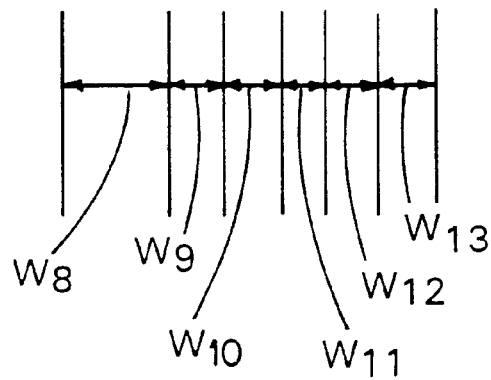
FIG. 8

GROOVE ROLLING OF PIPING ELEMENTS

This application claims the benefit of U.S. Provisional Patent Application No. 60/126,105, filed Mar. 25, 1999, the entire disclosure of which is incorporated herein by reference.

BACKGROUND OF THE INVENTION

The invention relates to groove rolling of piping, tubing, and fitting elements.

A grooved end pipe coupling, e.g. of the type illustrated in FIGS. 1 and 1A, is used for joining together ends of pipe elements in a leak tight assembly by use of grooves that are cut, cast or formed in the ends of the pipe elements. The terms "pipe elements", "pipes", and "piping", refer herein to sections of pipes, tubes, fittings, valves bodies, and the like, both in the plural and the singular. Referring to FIGS. 2 and 3, critical parameters of a grooved end connection include: the gasket seat diameter, $D_s$, groove diameter, $D_g$, gasket seat width, $W_s$, and groove width, $W_g$. In the case of wrought metal piping elements, e.g. tubing, fittings, or valve bodies, the grooved end of the piping element, P, is conventionally produced by either a cutting (machining) operation or a rolling (contour roll forming) operation as shown in piping element $P_{CUT}$, of FIG. 2, and piping element $P_{ROLL}$, of FIG. 3, respectively. In the case of a cast fitting or valve body, the grooved end connection is normally either cut in the configuration of a piping element, $P_{CUT}$ shown in FIG. 2, or cast in the dual outward step configuration of a piping element, $P_{CAST}$, shown in FIG. 4. Each piping element includes a groove 30 a distance at least $W_s$ from an end. $P_{ROLL}$ includes an indented region 32 on its inner surface underneath groove 30.

Cut grooves for use with grooved end pipe couplings are typically prepared by the use of a turning process.

Roll grooves for use with grooved end pipe couplings have been prepared by an apparatus similar in function to that described in Kunsman U.S. Pat. No. 3,995,466 and Dole U.S. Pat. No. 5,279,143. Both of these patents describe a means for contour roll forming a groove in the end of the pipe element by which a segment of the pipe is press formed or stretched into the desired configuration by forcing a shaped die roller located outside of the pipe against a form roller located inside of the pipe.

Other examples of contour roll forming of pipes are presented in Constantine, Great Britain Patent 18201, Pritchett, et al. U.S. Pat. No. 3,191,416 and Vaill, et al. U.S. Pat No. 3,290,914. Although these latter three patents describe devices which force a die roller located inside the pipe against a form located outside of the pipe, the contour roll forming principle is the same as for the previous two patent references. That is, the pipe is locally shaped by radial press forming or stretching, into the desired contour.

Referring again to FIGS. 1, 1A, and 2–4, a typical grooved end pipe coupling assembly 10 consists of two or more housing segments 12, 14, a gasket 16, and fastening means, e.g. nuts 18 and bolts 20, for securing assembly 10 together with the end connections to be joined. Housing segments 12, 14 have keys 22 around the inner periphery at both ends, a shoulder 24 also around and just inside each key, and a gasket cavity 26. Keys 22 fit into grooves 30 formed in each pipe end to axially and transversely retain the end connections. Keys 22 and shoulders 24 are involved to varying degrees in maintaining coupling assembly 10 generally centered about the grooved end connection. Shoulder 24 fits closely around the gasket seat diameter to prevent gasket 16 from extruding outwardly under the internal pressure of the piping system, gasket 16 being retained in gasket cavity 26 and producing a seal on gasket seat surfaces 34 to form a leak tight assembly.

SUMMARY OF THE INVENTION

According to one aspect, the invention provides groove rollers for use with a roll grooving device for forming a groove in an outer surface of a pipe near an end of the pipe. The groove rollers include an outside roller and an inside roller. The outside roller has a surface that includes a first protrusion for forming the groove a first distance from the end of the pipe and a second protrusion positioned to contact the pipe a second distance from the end of the pipe when forming the groove, wherein the second distance is shorter than the first distance. The inside roller has a surface including a grooving notch configured to receive the first protrusion. The inside roller surface may include a second notch configured to receive the second protrusion.

In one feature, one of the outside and inside rollers includes a pipe abutment surface against which the end of the pipe is positioned when forming the groove.

In another feature, the outside roller includes a first aligning element and the inside roller includes a second aligning element configured to interact with the first aligning element to align the outside and inside rollers when forming the groove. The first aligning element may include a first alignment surface facing the first protrusion, and the second aligning element may include a second alignment surface which contacts the first alignment surface when forming the groove. The first alignment surface may be formed on a side of an alignment bead and the second alignment surface may be formed on a wall of an alignment slot which receives the alignment bead when forming the groove. In one embodiment, the second alignment surface is formed on a side of a second alignment bead, and the first alignment surface is formed on a wall of a second alignment slot which receives the second alignment bead when forming the groove, the second alignment slot being located between the second protrusion and the first mentioned alignment bead. The second alignment bead can include the pipe abutment surface.

In yet another feature, the second protrusion includes a chamfered surface which faces the first protrusion.

In a further feature, the first protrusion, a surface of the second protrusion and the grooving notch are configured to form an arcuate surface on the pipe adjacent to the groove when forming the groove. A tangent to the arcuate surface intersects an adjacent wall of the groove at an angle δ. The surface of the second protrusion is configured to decrease δ. In one embodiment, the surface of the second protrusion faces the first protrusion at an angle β from a perpendicular to the rotational axis of the outside roller, wherein β is in a range between about 0° and 70°.

According to another aspect of the invention, groove rollers include an outside roller and an inside roller. The outside roller has a surface which includes a first protrusion configured to form the groove, a second protrusion configured to inhibit flaring at the end of the pipe, and a first aligning element. The inside roller has a surface including a first notch configured to receive the first protrusion, a second notch configured to receive the second protrusion, and a second aligning element configured to interact with the first aligning element to align the outside and inside rollers during groove rolling. The first aligning element can include a first alignment surface formed on a side of an alignment bead and facing the first protrusion, and the second aligning element can include a second alignment surface formed on a wall of an alignment slot which receives the alignment bead when forming the groove. The second alignment surface contacts the first alignment surface when forming the groove.

The second alignment surface, in one embodiment, is formed on a side of a second alignment bead. In this instance, the first alignment surface is formed on a wall of a second alignment slot which receives the second alignment bead when forming the groove. The second alignment slot is located between the second protrusion and the first mentioned alignment bead. The second alignment bead can include a pipe abutment surface against which the end of the pipe is positioned when forming the groove, wherein the pipe abutment surface is at a small angle α from a perpendicular to the rotational axis of the inside roller. In a different embodiment, the side of the alignment bead also includes a pipe abutment surface against which the end of the pipe is positioned when forming the groove.

In one feature, the first protrusion, a surface of the second protrusion and the grooving notch form an arcuate surface on the pipe adjacent to the groove when forming the groove, such that a tangent to the arcuate surface intersects an adjacent wall of the groove at an angle δ, and wherein the surface of the second protrusion is configured to decrease δ. The surface of the second protrusion may be a chamfered surface that faces the first protrusion at an angle β from a perpendicular to the rotational axis of the outside roller, wherein β is in a range between about 0° and 70°.

In a third aspect, the invention provides groove rollers for use with a roll grooving device for forming a groove in an outer surface of a pipe near an end of the pipe. The groove rollers include an inside roller and an outside roller. The outside roller has a surface including a first protrusion configured to form the groove, a second protrusion positioned closer to the end of the pipe than the first protrusion when forming the groove, and a third protrusion. The inside roller has a surface including a first notch configured to receive the first protrusion, and a second notch for receiving the third protrusion to align the outside and inside rollers during groove rolling. The first protrusion, a surface of the second protrusion and the grooving notch form an arcuate surface on the pipe adjacent to the groove when forming the groove. A tangent to the arcuate surface intersects an adjacent wall of the groove at an angle δ. The surface of the second protrusion includes a chamfered surface configured to decrease δ.

In a fourth aspect, the invention provides groove rollers for use with a roll grooving device for forming a groove in an outer surface of a pipe near an end of the pipe. An outside roller has a peripheral surface that includes a first protrusion configured to form the groove, and a second protrusion has a surface configured to inhibit flaring of the end of the pipe when forming the groove. An inside roller has a peripheral surface that includes a notch configured to receive the first protrusion. Formed on one of the inside or outside rollers is a pipe abutment surface against which the end of the pipe is positioned when forming the groove.

In one feature, the pipe abutment surface is formed on a bead, and the other of the inside and outside rollers includes a slot configured to receive the bead when forming the groove. In one embodiment, the bead is formed on the inside roller. In another embodiment, the bead is formed on the outside roller, and the second protrusion has a shoulder on the pipe abutment surface.

In another feature, the second protrusion includes a surface facing the first protrusion, which, with the first protrusion and the notch, is configured to form an arcuate surface on the pipe adjacent to the groove when forming the groove, wherein a tangent to the arcuate surface intersects an adjacent wall of the groove at an angle δ, and wherein the surface of the second protrusion includes a chamfered surface configured to decrease δ. In one embodiment, the slot has a rounded or chamfered shoulder opposite the chamfered surface.

According to yet another aspect of the invention, a roll-grooved pipe element includes an end, a first groove formed a first distance from the end, a second groove a second distance from the end, wherein the second distance is greater than the first distance. The second groove includes a side wall adapted for use with a grooved end pipe coupling. An arcuate surface extends between the first groove and the second groove.

The rollers of the invention form a groove having a high wall against which a pipe coupling engages. This feature helps increase the loading capacity of the pipe coupling. The rollers also produce a grooved pipe end that is substantially parallel with the centerline of the pipe, rather than a flared or crimped pipe end. This is also desirable to improve sealing.

Another advantage of the invention is that the pipe abutment surface, which is formed on one of the rollers, moves with the pipe as it is being grooved. This feature helps rotate the pipe and thereby reduces slipping when roll grooving.

The alignment elements, which are integrated into the rollers, help keep the rollers aligned in operation.

These and other features and advantages of the invention will be apparent from the following description and from the claim

BRIEF DESCRIPTION OF THE DRAWINGS

FIG. 8 is a side section view of the outside roller of FIG. 6;

DESCRIPTION OF THE PREFERRED EMBODIMENTS

Figure 1:
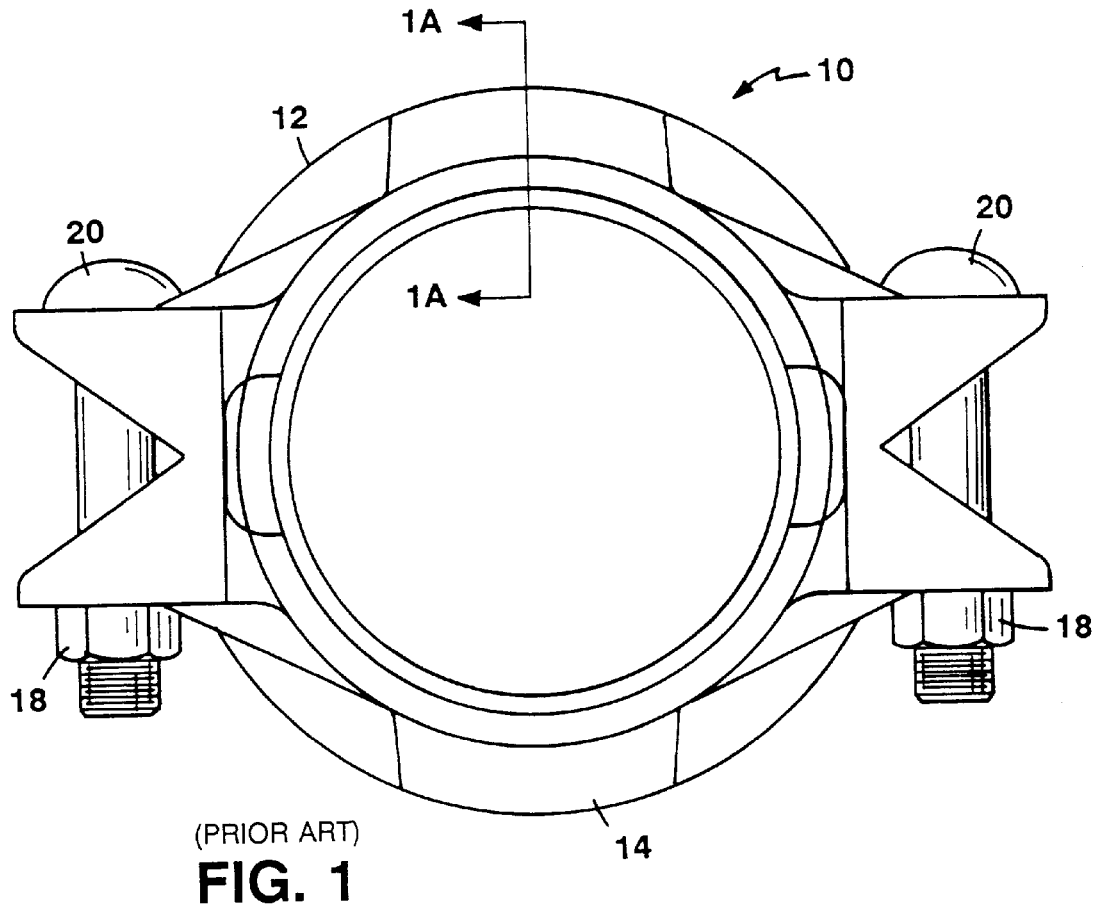
FIG. 1 is an end view of a typical prior art grooved end pipe coupling.
Figure 1A:
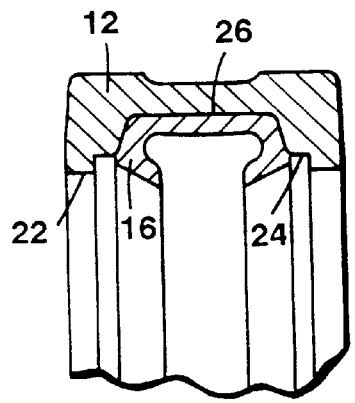
FIG. 1A is a side section view of the coupling housing and gasket taken at the line 1A—1A of FIG. 1.
Figure 2:
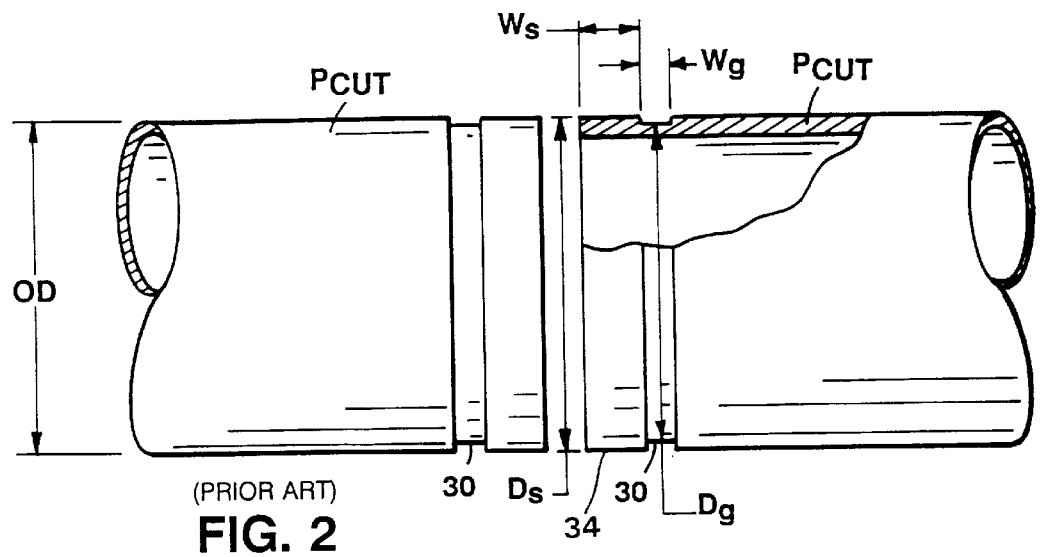
FIG. 2 is a partially broken away and sectioned side view of opposed ends of piping for a conventional (prior art) cut grooved pipe end connection.
Figure 3:
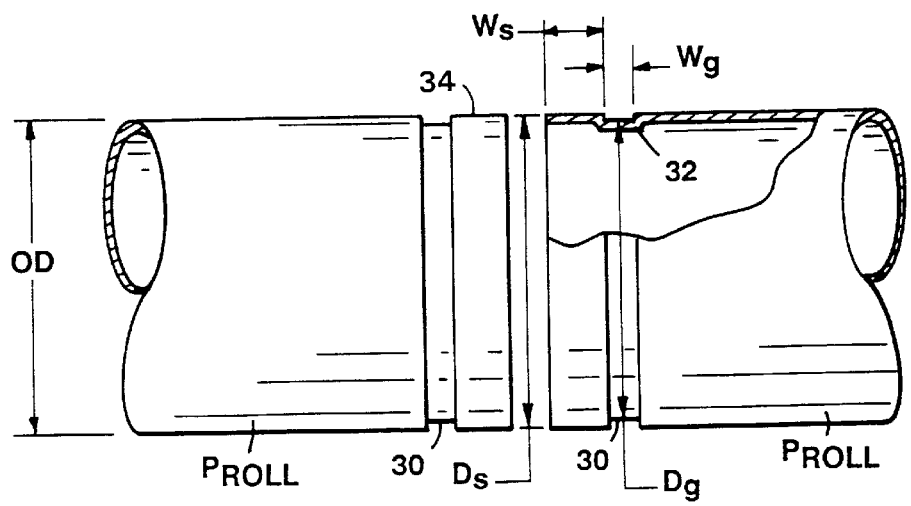
FIG. 3 is a partially broken away and sectioned side view of opposed ends of piping for a conventional (prior art) roll grooved pipe end connection.
Figure 4:
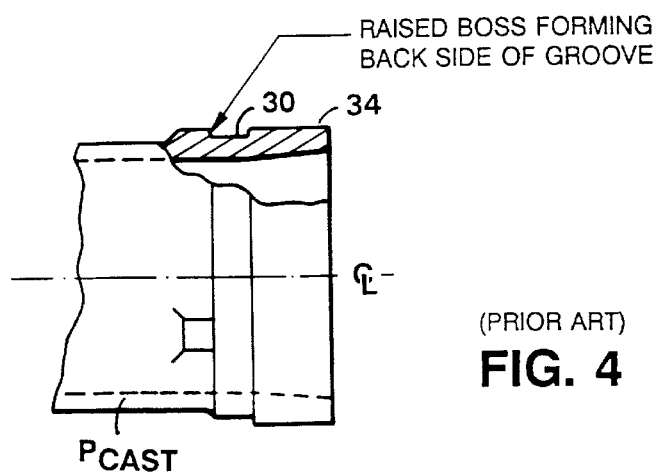
FIG. 4 is partially broken away and sectioned side view of an end of a pipe for a conventional (prior art) cast grooved pipe end connection.
Figure 5A:
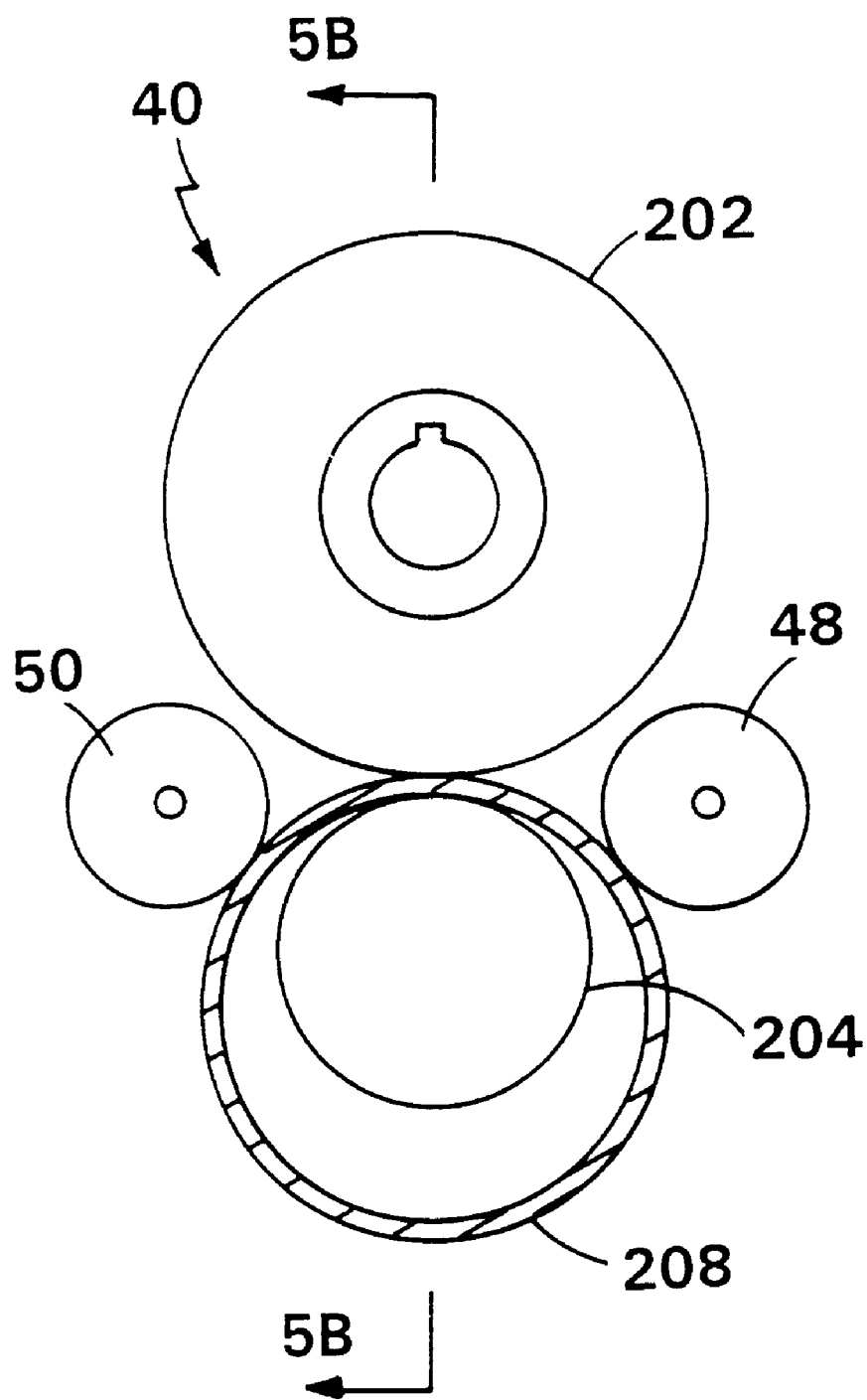
FIG. 5A is an end view of a groove rolling apparatus according to the invention.
Figure 5B:
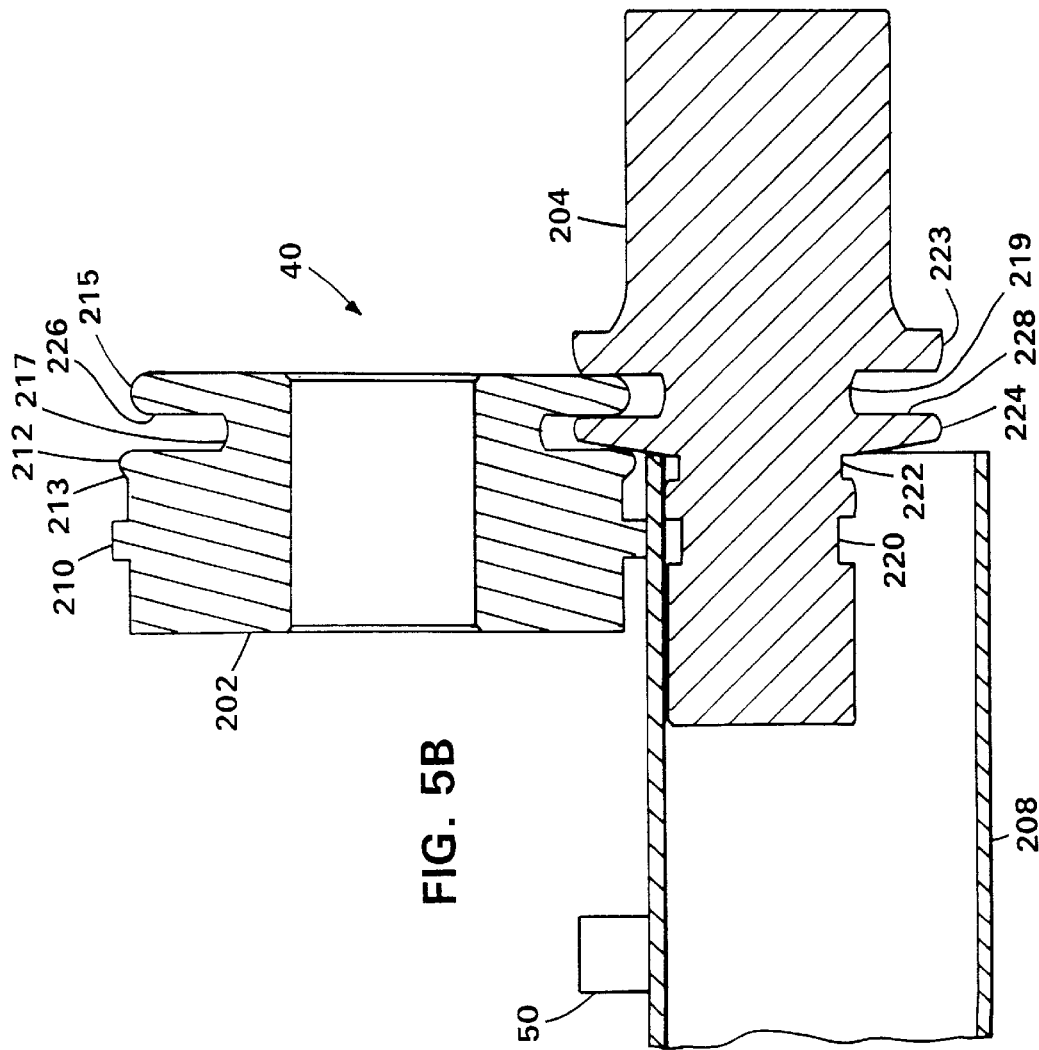
FIG. 5B is a side view, partially in section, of the groove rolling apparatus of FIG. 5A.
Figure 6:
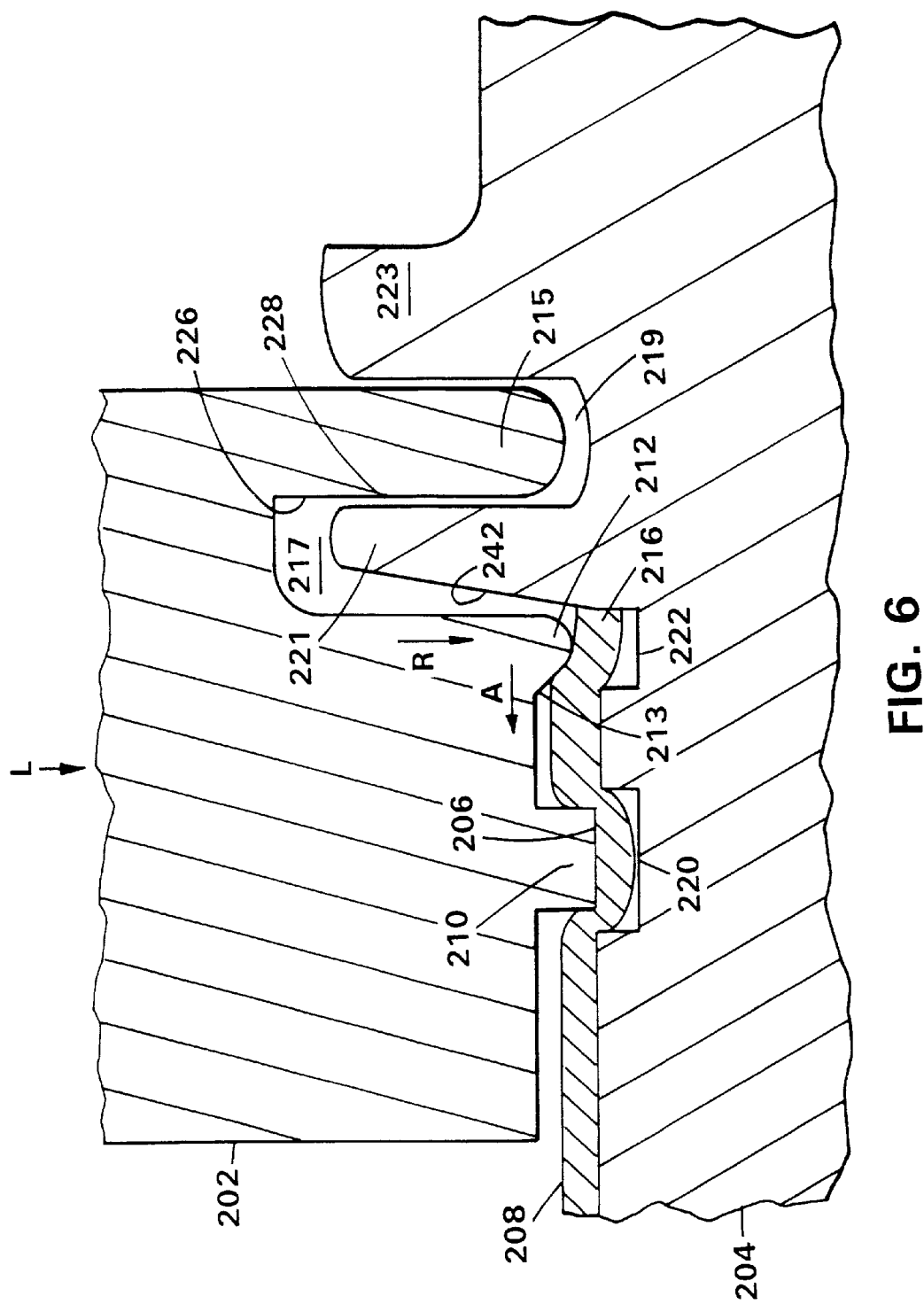
FIG. 6 is a side section view of an outside (driven) roller, an inside (driving) roller, and a rolled tube.

Referring to FIGS. 5A and 5B, a groove rolling apparatus 40 for forming a groove in the end of a pipe 208 includes an outside (driven) roller 202, an inside (driving) roller 204, and positioning rollers 48, 50. Positioning rollers 48, 50 hold pipe 208 in position during groove rolling and provide downward and lateral forces to pipe 208 to restrict pipe 208 from spiraling out from between rollers 202, 204 during groove rolling. For example, the positioning roller assembly described in Chatterley et al. U.S. Pat. No. 5,570,603, issued Nov. 5, 1996, the entire disclosure of which is incorporated herein by reference, can be used with groove rolling apparatus 40.

Referring now also to FIGS. 6–9, outside and inside rollers 202, 204 are used to form an inward groove 206 near an end 216 of pipe 208. A peripheral surface of outside roller 202 includes a first protrusion 210 for creating groove 206, and a second protrusion 212, which is positioned closer to pipe end 216 than protrusion 210 when forming groove 206. A peripheral surface of inside roller 204 includes a first indentation or grooving notch 220 configured to receive first protrusion 210, and which acts with first protrusion 210 of top roller 202 to form groove 206. Inside roller also includes a second indentation or notch 222 configured to receive the second protrusion, and which provides space for pipe end 216.

Second protrusion 212 is configured to help increase the height of a wall edge 214 of groove 206 and to resist flaring of pipe end 216. Second protrusion 212 includes a chamfered surface 213 facing toward first protrusion 210, and is rounded at the top and towards the opposite side.

Chamfered surface is at an angle β from a perpendicular to the rotational axis of outside roller 202, which can be in a range of about 0° to about 70°.

When a radial load, L, is applied to outside roller 202, it is believed that protrusion 212 applies a radial load, R, and an axial load, A, to pipe end 216. The axial load tends to push the pipe material toward protrusion 210. This action produces a higher groove edge wall 214 than typical with a conventional outside roller (e.g., an outside roller without a protrusion 212). Groove edge wall 214 is formed with a substantially vertical face 225, which intersects an adjacent arcuate portion 230 having a tangent at an intersection angle δ to the vertical face 225. It is believed that protrusion 212 with chamfered surface 213 tends to minimize intersection angle δ, which helps to minimize shearing of the groove wall. A small intersection angle δ provides a steeper groove edge wall 214. This is advantageous because it improves the attachment of the pipe to the coupling, increasing the pressure rating of the joint and the ability of the joint to resist bending.

The radial load R applied to pipe 208 by protrusion 212 also acts to resist flaring of pipe end 216, tending to keep pipe end 216 more parallel with the central axis of pipe 208. Reduced flaring is advantageous because it improves the sealing of gasket 16 against the pipe. Protrusion 212 produces a small secondary groove 238 having a rounded profile.

Outside roller 202 and inside roller 204 each include a respective aligning element configured to interact with the other aligning element to align the outside and inside rollers when forming the groove. Outside roller 202 has an alignment bead 215, which appears as a finger in profile, and an alignment slot 217. Inside roller 204 includes a corresponding mating alignment slot 219 which is configured to receive alignment bead 215. Alignment slot 219 is provided between facing walls of inboard and outboard alignment beads 221, 223, which also appear as fingers in profile. Alignment slot 217 of outside roller 202 is configured to receive alignment bead 221. Alignment bead 215 has a diameter which is less than the diameter of either protrusion 210 or protrusion 212. Slot 217 extends well into outside roller 202. Outside roller 202 tends to screw out when roll forming groove 206 on pipe 208. Therefore, an alignment surface 226 on alignment bead 215 that faces protrusion 210 contacts a second alignment surface 228 on alignment bead 221. This maintains alignment of outside roller 202 with inside roller 204.

In operation, pipe 208 is positioned by the operator against a pipe abutment surface 242 of protrusion 221 of inside roller 204. Outside roller 202 is brought down (arrow, L) by a manually operated hydraulic actuator (not shown) to form groove 206. A pipe stand (not shown) can be used to support pipe 208 during groove rolling. Positioning rollers 48, 50 provide an offset angle as described in Chatterley et al. U.S. Pat. No. 5,570,603. Positioning the pipe with an offset angle causes outside roller 202 to produce a torque which tends to draw pipe 208 inward between the rollers 202, 204, thus restricting pipe 208 from spiraling out. Positioning rollers 48, 50, along with the weight of pipe 208, also act to resist a tendency of pipe 208 to lift off the support during groove rolling.

Figure 7:
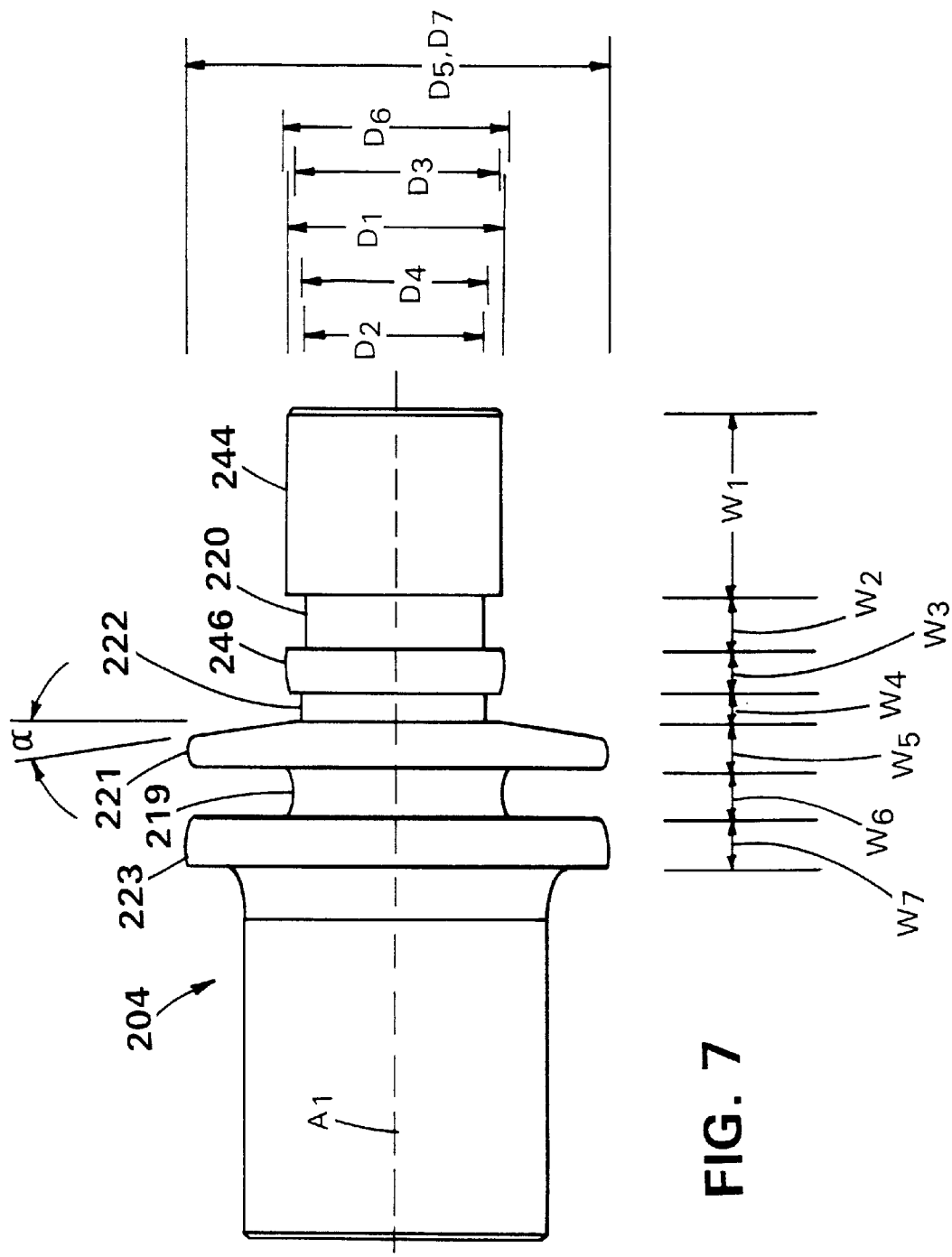
FIG. 7 is a side view of the inside roller of FIG. 6.

Referring to FIG. 7, to form a groove in a six-inch schedule 10 pipe, inside roller 204 has a diameter $D_1$ of hub 244 about 1.804 inches, a diameter $D_2$ of notch 220 of about 1.524 inches, a diameter $D_3$ of hub 246 of about 1.794 inches, a diameter $D_4$ of notch 222 of about 1.590 inches, a diameter $D_5$ of alignment bead 221 of about 3.544 inches, a diameter $D_6$ of slot 219 of about 1.844 inches, and a diameter $D_7$ of alignment bead 223 of about 3.544 inches. Inside roller 204 has a width $W_1$, of hub 244 of about 1.44 inches, a width $W_2$ of notch 220 of about 0.440 inch, a width $W_3$ of hub 246 of about 0.350 inch, a width $W_4$ of notch 222 of about 0.237 inch, a width $W_5$ of bead 221 of about 0.365 inch, a width $W_6$ of slot 219 of about 0.385 inch, and a width $W_7$ of bead 223 of about 0.385 inch. Bead 221 has a pipe abutment surface 242 formed at an angle, α, of about 7° from vertical (i.e. perpendicular to inner roll axis, $A_1$).

Outside roller 202 (FIG. 8) has a diameter $D_8$ of hub 248 of about 4.386 inches, a diameter $D_9$ of protrusion 210 of about 4.726 inches, a diameter $D_{10}$ of hub 249 of about 4.386 inches, a diameter $D_{11}$ of protrusion 212 of about 4.596 inches, a diameter $D_{12}$ of slot 217 of about 2.788 inches, and a diameter $D_{13}$ of alignment bead 215 of about 4.486 inches. Outside roller 202 has a width $W_8$ of hub 248 of about 1.094 inches, a width $W_9$ of protrusion 210 of about 0.344 inch, a width $W_{10}$ of hub 249 of about 0.378 inch, a width $W_{11}$ of protrusion 212 of about 0.237 inch, a width $W_{12}$ of slot 217 of about 0.385 inch, and a width $W_{13}$ of alignment bead 215 of about 0.365 inch. Protrusion 212 is at an angle, β, of about 45° from a perpendicular to outer roller axis, $A_2$.

Figure 9:
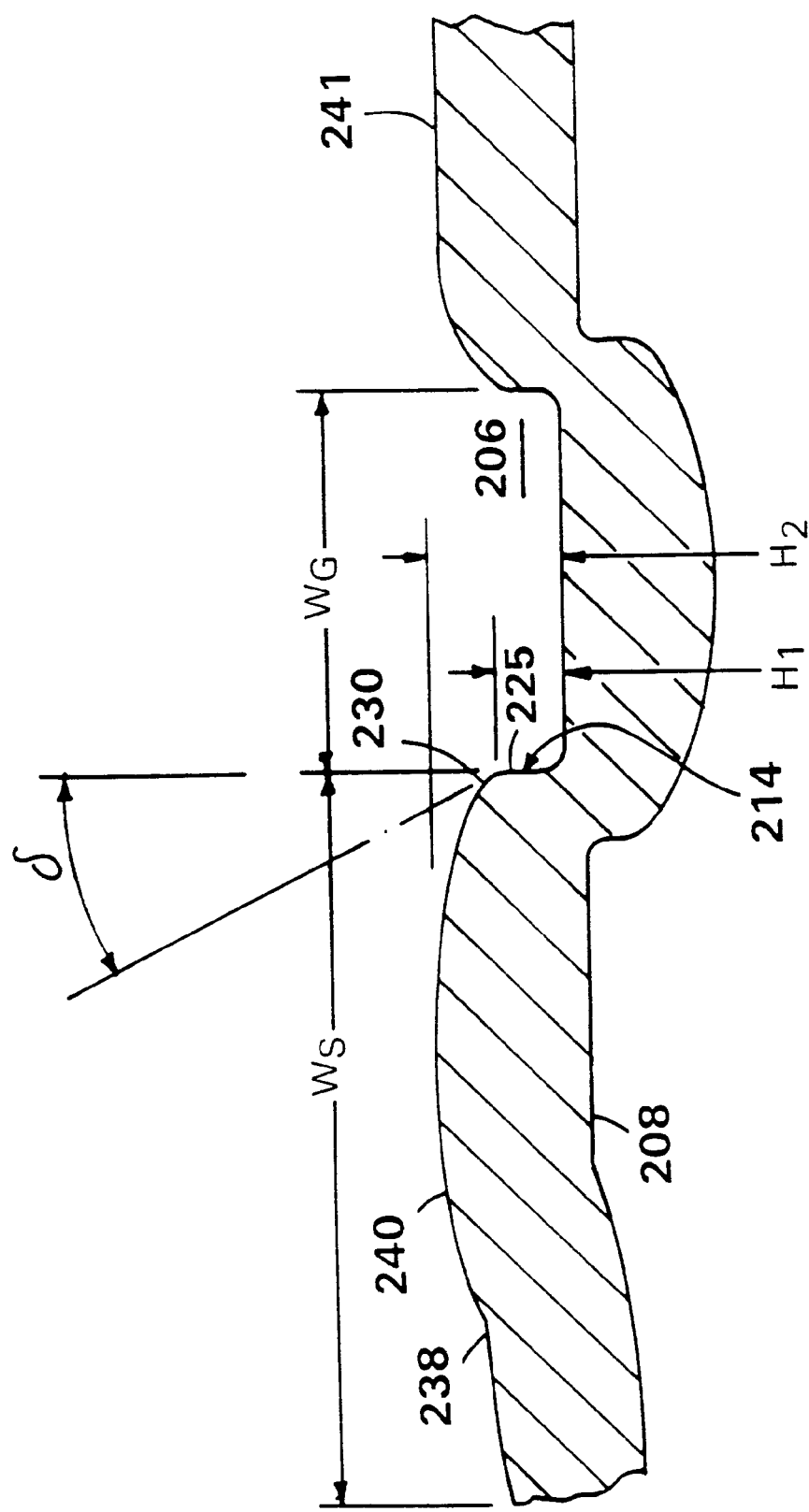
FIG. 9 is a cross-sectional view of a rolled tube.

Referring to FIG. 9, for the purpose of example only, groove rolling of a 6 inch schedule 10 stainless steel pipe 208 (6.615 inch diameter) with rollers 202, 204 produced a gasket seat 240 with a width Ws of about 0.635 inch, a groove 206 with a width $W_g$ of about 0.344 inch, and a vertical wall 214 of height H of about 0.048 inch. Gasket seat 240 was produced with a maximum diameter of 6.660 inches, as was back step 241 on the other side of groove 206.

Groove 206 was formed with a diameter of about 6.438 inches. The resulting total depth of groove 206, including arcuate portion 230, was 0.113 inches.

Figure 10:
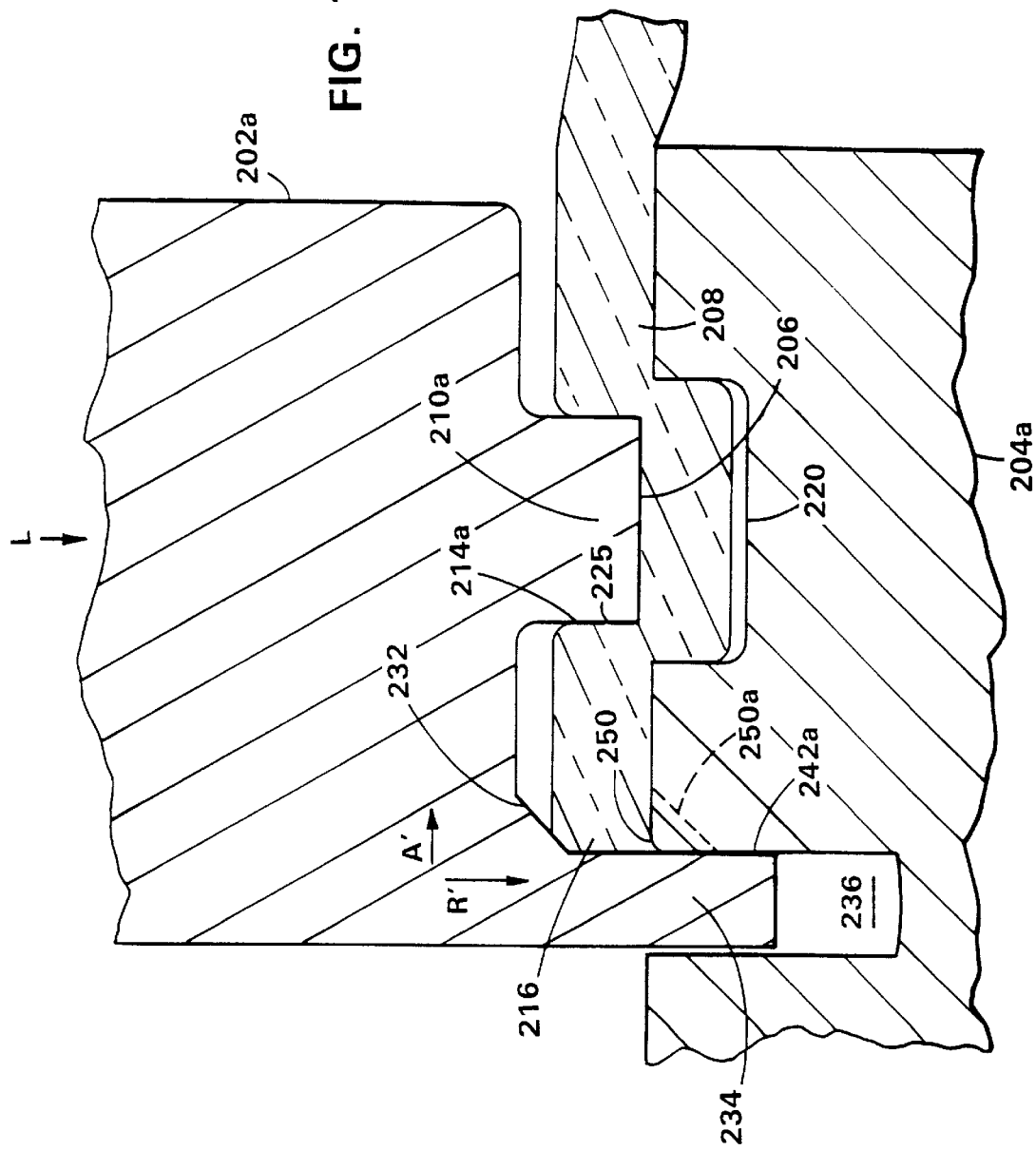
FIG. 10 is a side section view of alternative embodiments of an outside (driven) roller and an inside (driving) roller.

FIG. 10 shows another embodiment of groove rollers. Outside roller 202a has an elongated protrusion, or alignment bead 234, which is received within a slot 236 formed in an inside roller 204a. Slot 236 of inside roller 204a is relatively deep to accommodate the increased length of alignment bead 234. Alignment bead 234 provides a pipe abutment surface 242a which faces groove forming protrusion 210a and against which pipe end 216 abuts during groove rolling. Pipe abutment surface 242a also contacts an alignment surface of slot 236 when groove rolling to maintain alignment of outside roller 202a with inside roller 204a.

Extending contiguously from pipe abutment surface 242a on outside roller 202a is a corner chamfer 232 which provides a radial force, R', resisting upward movement of pipe end 216, thereby further reducing or eliminating flaring. Chamfer 232 also provides an axial force, A', which tends to push the pipe material toward protrusion 210a. This action produces a higher edge wall 214a than a conventional outside roller (e.g., an outside roller without a chamfer 232). Inside roller 204a has a shoulder 250 opposite outside roller chamfer 232 which can be rounded (as shown) or chamfered (as indicated in dashed line 250a).

Figure 11:
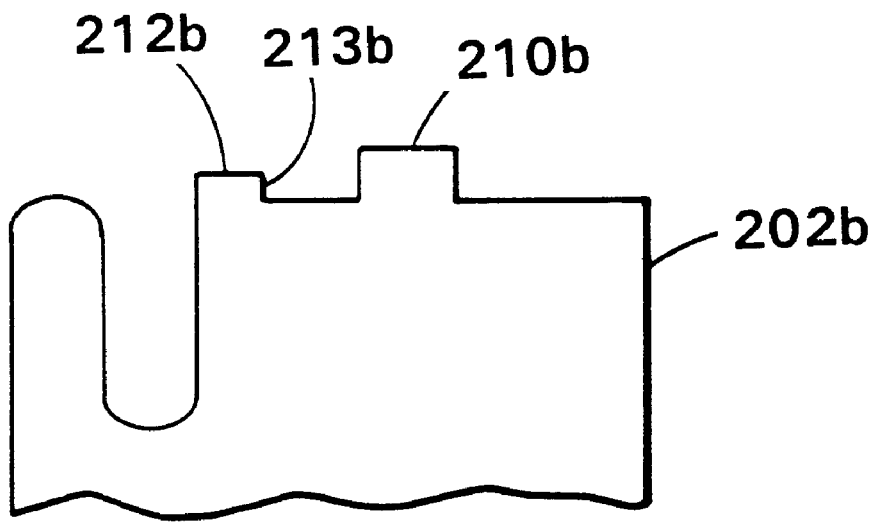
FIG. 11 is a detail of another embodiment of a second protrusion of an outside roller.
Figure 12:
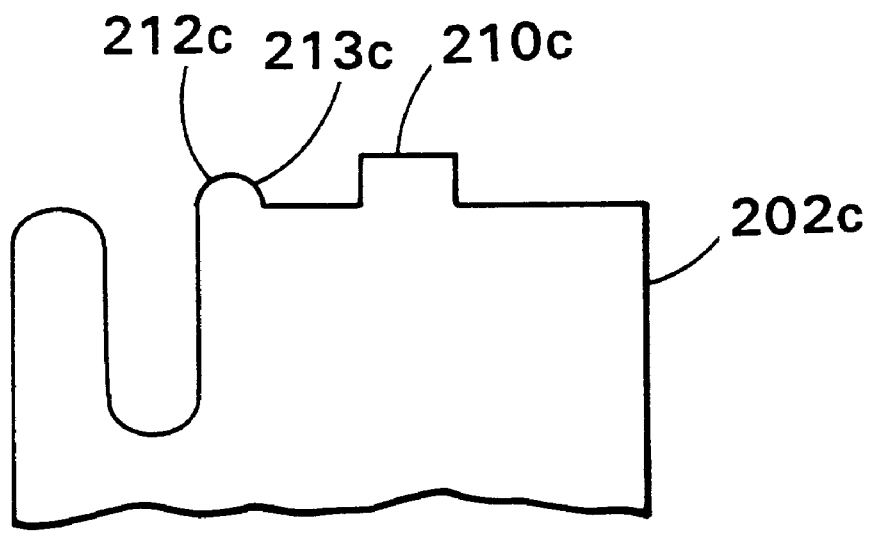
FIG. 12 is a detail of a different embodiment of a second protrusion of an outside roller.

Other embodiments of the second protrusion on the outside roller can be used. For example, FIG. 11 illustrates another embodiment of an outside roller 202b in which a second protrusion 212b has a vertical surface 213b facing a first protrusion 210b. FIG. 12 shows yet another embodiment of an outside roller 202c in which a second protrusion 212c has an arcuate surface facing a first protrusion 210c.

Other embodiments are within the following claims. For example, the outside roller may be the driving roller with the inside roller being the driven roller.

What is claimed is:

1. Groove rollers for use with a roll grooving device for forming a groove in a pipe near an end of the pipe, the groove rollers comprising:

an outside roller having a surface that includes a first protrusion for forming the groove a first distance from the end of the pipe and a second protrusion positioned to contact the pipe a second distance from the end of the pipe when forming the groove, wherein the second distance is shorter than the first distance, said outside roller including a pipe abutment surface against which the end of the pipe is positioned when forming the groove; and an inside roller having a surface including a grooving notch configured to receive the first protrusion.

2. The groove rollers of claim 1, wherein the outside roller includes a first aligning element and the inside roller includes a second aligning element configured to interact with the first aligning element to align the outside and inside rollers when forming the groove.

3. The groove rollers of claim 2, wherein the first aligning element comprises a first alignment surface facing the first protrusion and the second aligning element comprises a second alignment surface which contacts the first alignment surface when forming the groove.

4. The groove rollers of claim 3, wherein the first alignment surface is formed on a side of an alignment bead and the second alignment surface is formed on a wall of an alignment slot which receives the alignment bead when forming the groove.

5. The groove rollers of claim 1, wherein the second protrusion comprises a chamfered surface which faces the first protrusion.

6. The groove rollers of claim 1, wherein the outside roller includes an alignment bead and the inside roller defines a slot for receiving the alignment bead.

7. The groove rollers of claim 6, wherein a side of the alignment bead comprises said pipe abutment surface.

8. Groove rollers for use with a roll grooving device for forming a groove in a pipe near an end of the pipe, the groove rollers comprising:

an outside roller having a surface which includes a first protrusion configured to form the groove, a second protrusion configured to inhibit flaring at the end of the pipe, a first aligning element, and a pipe abutment surface against which the end of the pipe is positioned when forming the groove; and an inside roller having a surface including a first notch configured to receive the first protrusion, a second notch configured to receive the second protrusion, and a second aligning element configured to interact with the first aligning element to align the outside and inside rollers during groove rolling.

9. The groove rollers of claim 8, wherein the first aligning element comprises a first alignment surface facing the first protrusion and the second aligning element comprises a second alignment surface which contacts the first alignment surface when forming the groove.

10. The groove rollers of claim 9, wherein the first alignment surface is formed on a side of an alignment bead and the second alignment surface is formed on a wall of an alignment slot which receives the alignment bead when forming the groove.

11. The groove rollers of claim 10, wherein the side of the alignment bead comprises said pipe abutment surface.

12. A The groove rollers of claim 11, wherein the surface of the second protrusion faces the first protrusion.

13. The grove rollers of claim 8, wherein the first aligning element comprises said pipe abutment surface.

14. Groove rollers for use with a roll grooving device for forming a groove in an outer surface of a pipe near an end of the pipe, the groove rollers comprising:

an outside roller having a surface including a first protrusion configured to form the groove, a second protrusion positioned closer to the end of the pipe than the first protrusion when forming the groove, and a third protrusion, the second and third protrusions defining a slot therebetween; and an inside roller having a surface including a first notch configured to receive the first protrusion, and first and second protrusions defining a second notch therebetween, the outside roller third protrusion being received in the second notch and the inside roller first protrusion being received in the outside roller slot to align the outside and inside rollers during groove rolling, wherein the first protrusion, a surface of the second protrusion and the grooving notch form an arcuate surface on the pipe adjacent to the groove when forming the groove, wherein a tangent to the arcuate surface intersects an adjacent wall of the groove at an angle δ, and wherein the surface of the second protrusion is configured to decrease δ.

15. Groove rollers for use with a roll grooving device for forming a groove in an outer surface of a pipe near an end of the pipe, the groove rollers comprising:

an outside roller having a surface including a first protrusion configured to form the groove, and a second protrusion comprising a surface configured to inhibit flaring of the end of the pipe when forming the groove;

an inside roller having a surface including a notch configured to receive the first protrusion; and a pipe abutment surface against which the end of the pipe is positioned when forming the groove, wherein the pipe abutment surface is formed on the outside roller.

16. The groove rollers of claim 15, wherein the pipe abutment surface is formed on a bead, and wherein the inside roller defines a slot configured to receive the bead when forming the groove.

17. The groove roller of claim 16, wherein the second protrusion includes a surface facing the first protrusion.

18. The groove rollers of claim 17, wherein the surface of the second protrusion facing the first protrusion comprises a chamfered surface.

19. The groove rollers of claim 16, wherein the inside roller includes a rounded or chamfered shoulder at an edge of the slot.

20. The groove rollers of claim 16, wherein the second protrusion comprises a shoulder on the pipe abutment surface.

21. Groove rollers for use with a roll grooving device for forming a groove in a pipe near an end of the pipe, the groove rollers comprising:

an outside roller having a surface that includes a first protrusion for forming the groove a first distance from the end of the pipe and a second protrusion positioned to contact the pipe a second distance from the end of the pipe when forming the groove, wherein the second distance is shorter than the first distance, said outside roller surface further including an alignment bead, said second protrusion and said alignment bead defining an alignment slot therebetween; and an inside roller having a surface including a grooving notch configured to receive the first protrusion, said inside roller surface further including first and second alignment beads defining an alignment slot therebetween, the first inside roller alignment bead being received in the outside roller alignment slot, and the outside roller alignment bead being received in the inside roller alignment slot.

22. The groove rollers of claim 21, wherein said inside roller includes a pipe abutment surface against which the end of the pipe is positioned when forming the groove.

23. The groove rollers of claim 21, wherein the second protrusion comprises a chamfered surface which faces the first protrusion.

24. The groove rollers of claim 21, wherein the first protrusion, a surface of the second protrusion and the grooving notch are configured to form an arcuate surface on the pipe adjacent to the groove when forming the groove, wherein a tangent to the arcuate surface intersects an adjacent wall of the groove at an angle δ, and wherein the surface of the second protrusion is configured to decrease δ.

25. The groove rollers of claim 24, wherein the surface of the second protrusion faces the first protrusion.

26. The groove rollers of claim 25, wherein the surface of the second protrusion faces the first protrusion at an angle β, from a perpendicular to the rotational axis of the outside roller, wherein β is in a range between about 0° and 75°.

27. The groove rollers of claim 21, wherein the inside roller surface defines a second notch configured to receive the second protrusion.

28. Groove rollers for use with a roll grooving device for forming a groove in a pipe near an end of the pipe, the groove rollers comprising:

an outside roller having a surface which includes a first protrusion configured to form the groove, a second protrusion configured to inhibit flaring at the end of the pipe, and an alignment bead, said second protrusion and said alignment bead defining an alignment slot therebetween; and an inside roller having a surface including a first notch configured to receive the first protrusion, and first and second alignment beads defining an alignment slot therebetween, the first inside roller alignment bead being received in the outside roller alignment slot, and the outside roller alignment bead being received in the inside roller alignment slot.

29. The groove rollers of claim 28, wherein said inside roller includes a pipe abutment surface against which the end of the pipe is positioned when forming the groove.

30. The groove rollers of claim 28, wherein the second protrusion comprises a chamfered surface which faces the first protrusion.

31. The groove rollers of claim 28, wherein the first protrusion, a surface of the second protrusion and the grooving notch are configured to form an arcuate surface on the pipe adjacent to the groove when forming the groove, wherein a tangent to the arcuate surface intersects an adjacent wall of the groove at an angle δ, and wherein the surface of the second protrusion is configured to decrease δ.

32. The groove rollers of claim 31, wherein the surface of the second protrusion faces the first protrusion.

33. The groove rollers of claim 32, wherein the surface of the second protrusion faces the first protrusion at an angle β from a perpendicular to the rotational axis of the outside roller, wherein β is in a range between about 0° and 75°.

34. The groove rollers of claim 28, wherein the inside roller surface defines a second notch configured to receive the second protrusion.

* * * * *